United States Patent [19]

Takada

[11] 4,404,684
[45] Sep. 13, 1983

[54] OBJECT SOLID FIGURE RECOGNIZING METHOD AND APPARATUS

[75] Inventor: Munekazu Takada, Uji, Japan

[73] Assignee: Unitika Ltd., Hyogo, Japan

[21] Appl. No.: 174,060

[22] Filed: Jul. 31, 1980

[51] Int. Cl.³ .................................................. G06K 9/00
[52] U.S. Cl. ...................................... 382/25; 356/376;
356/387; 382/20; 382/28; 382/65
[58] Field of Search ............. 340/146.3 H, 146.3 AC,
340/146.3 F, 146.3 R, 146.3 Q; 250/223 B;
356/376, 377, 379, 380, 385–388; 364/414;
358/107; 382/20, 25, 28, 65

[56] References Cited

U.S. PATENT DOCUMENTS

| | | | |
|---|---|---|---|
| 3,216,311 | 11/1965 | Bibbero et al. | 358/107 |
| 3,470,384 | 9/1969 | Bodnar | 356/379 |
| 3,529,169 | 9/1970 | Heaney et al. | 356/376 |
| 3,549,896 | 12/1970 | Masino et al. | 356/385 |
| 3,724,958 | 4/1973 | Callan | 356/384 |
| 3,852,579 | 12/1974 | Sohn et al. | 356/387 |
| 3,955,179 | 5/1976 | Planke | 340/146.3 H |
| 3,967,242 | 6/1976 | Isoo et al. | 340/146.3 H |
| 4,007,440 | 2/1977 | Kono et al. | 340/146.3 AC |
| 4,052,620 | 10/1977 | Brunnett | 364/414 |
| 4,055,834 | 10/1977 | Planke | 340/146.3 F |
| 4,072,298 | 2/1978 | Wilder | 340/146.3 AC |
| 4,206,360 | 6/1980 | LeMay | 364/414 |
| 4,298,285 | 11/1981 | Ito | 356/376 |

Primary Examiner—Leo H. Boudreau
Attorney, Agent, or Firm—Sughrue, Mion, Zinn, Macpeak & Seas

[57] ABSTRACT

An apparatus and method for recognizing the shape of solid objects in which an object to be recognized is passed through a cylindrical rotary unit upon a transparent conveyor. Inside the cylindrical rotary unit a photoelectric sensor is provided by which light is applied to the object and light reflected from or blocked by the object is detected to provide an actual projection pattern of the object for successive small incremental angles of rotation. The actual projection spectrum thus formed for contiguous slices of the object is analyzed by a computer to recognize the shape of the object.

11 Claims, 5 Drawing Figures

OBJECT SOLID FIGURE RECOGNIZING METHOD AND APPARATUS

BACKGROUND OF THE INVENTION

The present invention relates to methods and apparatuses for recognizing the shape of solid objects. More particularly, the invention relates to a method for recognizing the shape of solid objects in which light from a photoelectric sensor in a cylindrical rotary unit rotating at high speed is applied to a moving object to detect the actual projection pattern (shadow pattern) of the object thereby to recognize the solid figure of the object and an apparatus for practicing the method.

Heretofore, for selection, determination, measurement and inspection of solid objects including both natural products and industrial products, either a visual inspection method using the human eye or a relatively simple mechanical or electrical technique was employed to recognize the shapes and characteristics of objects.

Visual inspection is advantageous in that objects can be recognized with a high accuracy because recognition is achieved precisely. However, the visual inspection is still disadvantageous in that the inspector may make errors depending on environmental conditions such as the colors and glosses of objects and the available illumination. If his eyes become fatigued, then he can no longer continue the visual inspection. As for objects having unavoidable variations from item to item, the standard of decision may fluctuate depending upon the individual inspector and a fatigue factor. This is an unavoidable drawback accompanying the visual inspection method.

With a mechanical or electrical technique, the objects are recognized one-dimensionally or two-dimensionally with reference to predetermined standardized data. Thus, such a method is relatively simple. In this method, if objects to be recognized do not vary, then a fixed system suitable for the standardized properties of the objects can be provided. However, if the objects to be inspected are changed, then the system becomes completely useless. That is, the fundamental measurements of the system must be re-established in conformance with the new objects. This is a serious difficulty accompanying the conventional method utilizing a mechanical or electrical technique.

The invention is intended to eliminate the above-described drawbacks accompanying conventional object recognizing techniques.

A first object of the invention is to provide a method in which the shape of a solid object, that is, the three-dimensional figure of an object, is accurately recognized with a high accuracy and to provide an apparatus for practicing this method.

A second object of the invention is to provide a method and corresponding apparatus in which the shape of a solid moving object is automatically recognized at high speed and selection, measurement and inspection of objects are automatically carried out with less labor according to properties of the objects such as shape, partial sampling characteristic, non-uniformity, disposition, volume and size.

A third object of the invention is to provide solid object shape recognizing method and an apparatus for practicing the method adapted to be utilized in conjunction with other machines, devices and tools to automatically conduct the selection, measurement and inspection of objects with less labor required.

SUMMARY OF THE INVENTION

The foregoing objects and other objects of the invention have been achieved by an solid object shape recognizing method and an apparatus for practicing the method in which a cylindrical rotary unit incorporating a photoelectric sensor having a light source section and a light receiving section confronting with the light source section is rotated while an object to be inspected is passed through a hollow part of the rotary unit. Light from the light source section is applied to the object to detect the actual projection pattern of the object. An actual projection spectrum forming the actual projection pattern is analyzed by a computer to recognize the solid figure of the object.

The above-described method may be practiced by a solid object shape recognizing apparatus including a cylindrical rotary unit incorporating a photoelectric sensor adapted to optically read the actual projection pattern of an object, input means for transmitting the actual projection pattern to memory means in a computer, memory means for storing the actual projection pattern and an actual projection spectrum forming the actual projection pattern, processing means for analyzing the actual projection pattern to perform solid figure recognition, output means for delivering the result of the solid figure recognition as solid figure recognition data from the computer, and means for conveying the object.

The term "actual projection pattern" as used herein is intended to mean the consolidation of the projections of a moving object which are detected for incremental small angles of rotation in a range of rotation of from 0° to 180° around the axis in the direction of movement of the object. The projections have dimensions which are particular to the object being detected.

The term "actual projection spectrum" is intended to mean a spectrum which normally can be calculated from the above-described consolidation of an object's projection. The term is further defined as follows. It is assumed that the moving object being detected is divided into a plurality of slices by phantom planes perpendicular to the direction of movement of the object. The actual projection spectrum is constituted by variations in projection of the object which are detected from each incremental small angle of rotation in the range of rotation of from 0° to 180°.

DESCRIPTION OF THE PREFERRED EMBODIMENTS

Figure 1:
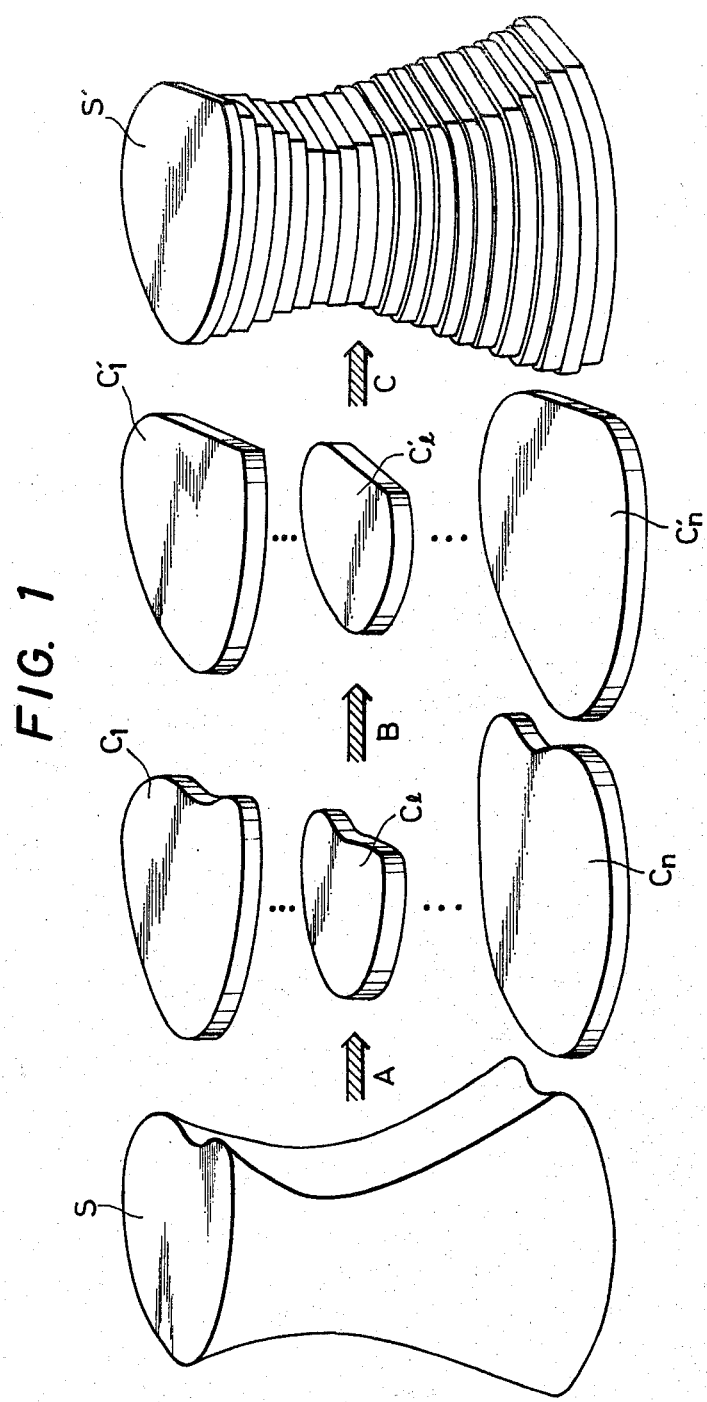
FIG. 1 is a diagram for a description of the principles of operation of a solid object shape recognizing method of the invention.

Before the invention is described in detail, first the fundamental principles of recognizing the shape of a solid object according to the invention will be described.

Considering a convex plate, when a parallel planar light beam is applied to the plate parallel to the surfaces of the plate, then the actual projection of the convex plate is formed in a plane which is perpendicular to the parallel planar light beam on a side opposite to the light source with respect to the convex plate. When, under this condition, the convex plate is rotated around an axis (which may be outside the convex plate) perpendicular to the convex plate, its actual projection varies forming an actual projection spectrum which has a period corresponding to an angle of rotation of 180°. The spectrum of a single period has a unique correspondence to the two-dimensional shape of the convex plate.

Hereinafter, a convex plate having the predetermined thickness will be referred to as "a slice". A slice has the following relationship with respect to the shape of a solid object. An arbitrary fixed axis of rotation is provided for the object to be detected. A parallel, planar light beam is applied to the object in a direction perpendicular to the fixed axis. Under this condition, the object is turned around the axis through an angle of 180° to detect its actual projection pattern. The actual projection pattern is decomposed respectively for the various slices which are obtained by cutting the object by phantom planes parallel to a direction perpendicular to the axis. Then, the shape of each slice is recognized from the actual projection spectrum of the slice. Finally, the overall shape of the object is recognized by stacking the slices.

The invention is based on the above-described principles of recognizing the shape of an object. The actual projection pattern data according to the principles of the invention can be sampled by one of the following two methods. In the first of the two methods, a photoelectric sensor is arranged at a fixed position while the object being recognized is rotated. In the other method, the object remains stationary while the photoelectric sensor is rotated around the object.

The preferred object shape recognizing method of the invention corresponds to the latter method. While an opaque object is statically passed through a photoelectric sensor rotating at a high speed, its actual projection pattern data composed of a number of actual projection spectra is detected. At the same time, a computer decomposes the actual projection pattern data into the actual projection spectra of the slices. The shape of the object is then recognized by piling the slices one on another.

More specifically, according to the invention, while an opaque object is passing through a cylindrical rotary unit rotating at high speed, a light source section directs parallel planar light beams to the object as a result of which the actual projection pattern of the object is provided by a light receiving section as the rotary unit turns through 180° around an arbitrary axis perpendicular to the light beam. The actual projection pattern thus provided is analyzed (decomposed) by a computer into the actual projection spectra of a number of slices which are obtained by cutting the object by phantom planes perpendicular to the rotating axis thereby determining the sectional figures of the slices. Then, the figures of the slices thus determined are stacked one on another to recognize the shape of the object.

A preferred method for recognizing the shape of a solid object and an apparatus for practicing the method according to this invention will be described in detail with reference to the accompanying drawings.

FIG. 1 is an explanatory diagram for a description of the principles of the method of recognizing the shape of a solid object according to the invention showing a three-dimensional figure of an object S of simple configuration. As shown in FIG. 1, the object S has an upper flat surface and lower flat surface parallel to the upper flat surface and is divided by phantom planes parallel with the top and bottom surfaces into N slices $C_1$, $C_2$, $C_3$, ..., $C_l$ ... and $C_n$ of equal thickness. However, it is not always necessary to divide on object into slices of equal thickness.

Figure 2:
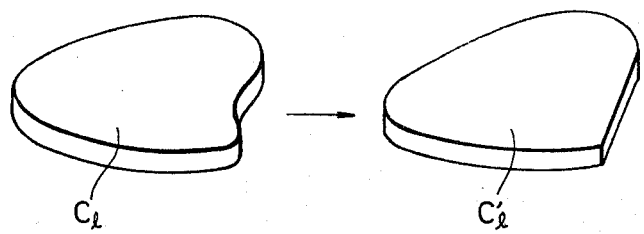
FIG. 2 is an explanatory diagram for a description of a fill-up conversion of a slice $C_i$ of an object according to the method of the invention.

FIG. 2 shows a slice $C_l$ which has a recess partially filled in. The recess of the slice $C_l$ is filled up minimumly as a result of which the slice $C_l$ is converted into a slice $C_l'$. This operation will be hereinafter referred to as "a fill-up conversion" when applicable.

Referring back to FIG. 1, the slices $C_1$, ..., $C_l$, ..., $C_n$ are subjected to fill-up conversion to provide slices $C_1'$, ..., $C_l'$, $C_n'$, respectively. A new object S' is then formed by piling the slices $C_1'$, ..., $C_l'$, ... $C_n'$. Thus, the shape of a given solid object can be determined through the process steps A→B→C indicated in FIG. 1. It is obvious that, as the thickness of each slice is reduced, the shape of the object can be more accurately determined.

According to the method of the invention, an object is passed through the hollow part or central through-hole of a cylindrical rotary unit which is being rotated to obtain the actual projection pattern of the object. In this operation, it is essential that the object pass through the central through-hole without contacting the rotary unit. For this purpose, a conveying device such as a conveyor belt is arranged so that it moves in the axial or longitudinal direction of the rotary unit without contacting the rotary unit and the object is placed on the conveyor belt to so pass through the hollow part of the rotary unit.

In order to obtain the actual projection pattern of an object, the object must be held in a steady position, that is, it must be placed statically on a conveying device such as a conveyor belt when passing through the rotary unit. It is necessary that the position of the object on the conveying device not be changed by vibration or other external force. Therefore, in the case of an object which may otherwise be subject to such movement while being transported on the conveyor belt, the object should be held in place with the use of holes or grooves in the conveyor belt. However, it should be noted that, if the object's position is only very slightly changed, no serious recognition problem will result. Depending on the actual shape of an object, the actual projection patterns thereof can be corrected by a computer.

It is necessary that light from a light source section pass through the conveyor belt. Therefore, the conveyor belt must have a higher transparency than an object to be detected.

Figure 3:
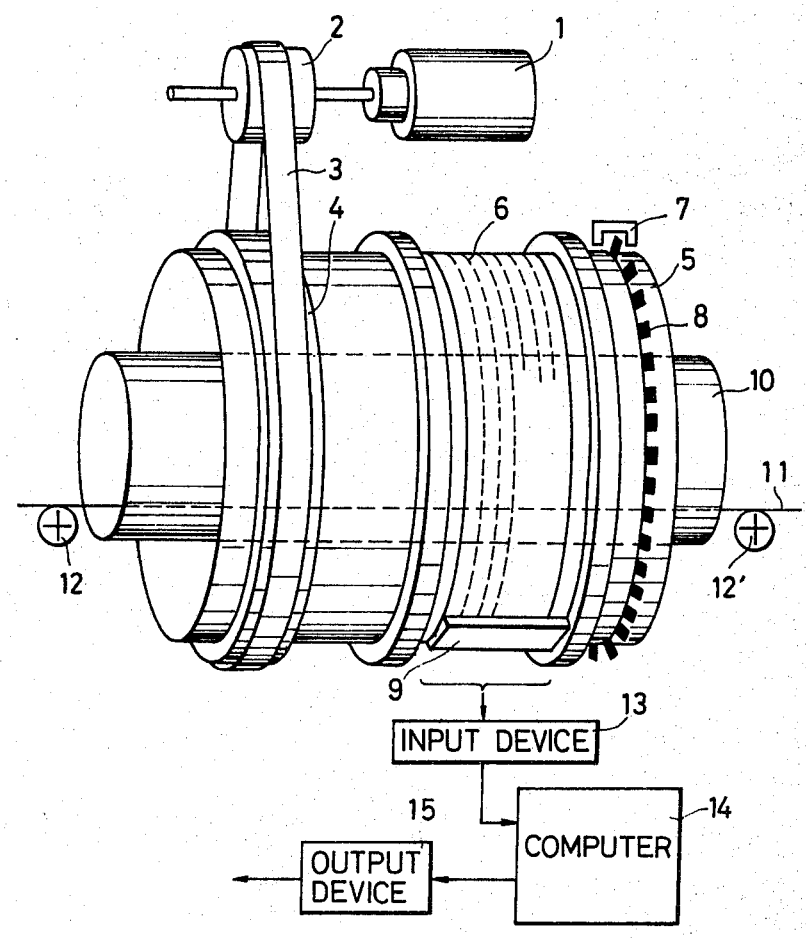
FIG. 3 is a perspective view showing a solid object shape recognizing apparatus of the invention.
Figure 4:
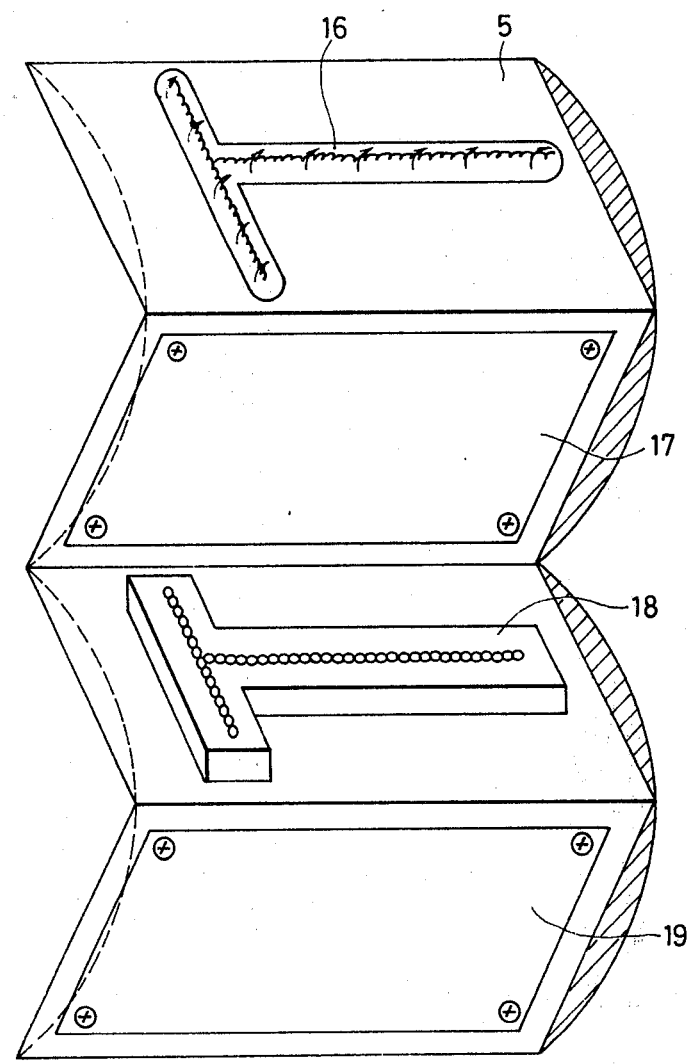
FIG. 4 is an unfolded view showing the internal arrangement of a cylindrical rotary unit in the apparatus shown in FIG. 3.

Now, a preferred embodiment of apparatus for practicing the method of the invention will be described in detail with reference to FIGS. 3 and 4. FIG. 3 is a perspective view showing an example of an apparatus for recognizing the shape of a solid object constructed according to the invention while FIG. 4 is an unfolded diagram showing an interior view of the apparatus in FIG. 3.

In FIG. 3, a cylindrical rotary unit 5 is set in place with its longitudinal axis parallel to the floor surface. The rotary unit 5 is rotated by a driving motor 1 through a belt 3 which is laid over a pulley 2 coupled to the motor 1 and a pulley 4 provided on one end portion of the cylindrical surface of the rotary unit 5. The rotary unit 5 is hollow. A T-shaped light source section 16 seen in FIG. 4 and a T-shaped light receiving section 18 are provided symmetrically on the inner wall of the rotary unit 5 thus forming a photoelectric sensor. In addition to the light source section 16 and the light receiving section 18, a power supply regulator 17 for controlling the electric power applied to various electronic units and a sensor signal converting electronic unit 19 are provided inside the rotary unit.

A transparent sleeve 10 is disposed in the hollow part of the cylindrical rotary unit 5 coaxially therewith and fixedly secured to a frame (not shown). A transparent endless conveyor belt 11 runs through the sleeve 10 extending below and parallel to the central longitudinal axis of the sleeve 10. Rolls 12 and 12' are disposed at opposite ends of the sleeve 10 to drive the endless conveyor belt 11. An object loaded on the conveyor belt 11 at the loading side is moved through the hollow part of the cylindrical rotary unit 5 as the conveyor belt 11 runs. The sleeve 10 is preferably made of a transparent material such as acrylic resin (methylmethacrylate resin) while the conveyor belt 11 is preferably made of a transparent material such as polyvinyl chloride. If an object falls off the conveyor belt 11, breakage of the various elements provided inside the cylindrical rotary unit 5 is prevented by the provision of the sleeve 10 inside the cylindrical rotary unit.

A number of fins 8 are provided at equal intervals on one end portion of the cylindrical surface of the rotary unit 5 for use in determining the rotational position of the rotary unit 5. A micro-photosensor 7 is mounted on a ring above the fins 8. When the cylindrical rotary unit 5 turns, the microphotosensor 7 detects the passage of the fins 8. By counting the number of fins which have passed, the rotational position is determined. In order to obtain the actual projection pattern data of an object, it is necessary to turn the cylindrical rotary unit 5 through 180°. It is detected by the micro-photosensor 7 whether the cylindrical rotary unit 5 has turned through 180°.

A slip ring 6 extends around a part of the outer surface face of the cylindrical rotary unit 5 and a pick-up device 9 is provided in contact with the slip ring 6. The slip ring 6 and the pick-up device 9 serve to supply electric power to the electronic units provided inside the cylindrical rotary unit 5. Through the slip ring 6 and the pick-up device 9, pulse transmission between the cylindrical rotary unit 5 and an externally provided computer 14 and data transmission between the rotary unit 5 and the outside are carried out. The computer 14 having storing and processing functions is coupled through an input device 13 to the cylindrical rotary unit 5. The input device 13 operates to input the actual projection pattern of an object as an electrical signal to a memory of the computer 14. The computer 14 includes memory devices for storing an actual projection pattern formed of a number of actual projection spectra and actual projection spectra themselves and a processing device for analyzing actual projection spectra to recognize the shape of a solid object. The shape recognition data analyzed by the computer 14 is outputted through an output device 15. The solid figure recognition data may, for example, be applied to other machines or devices coupled to the output device 15 for purposes of control.

The size of the above-described cylindrical rotary unit 5 is not particularly limited. In the above-described embodiment, the light source section and the light receiving section are T-shaped. However, the invention is not limited thereto or thereby and the configurations of these may be other than a T-shape.

An object of which the shape is to be recognized is placed on the conveyor belt 11. Thereafter, the conveyor belt 11 is run while the cylindrical rotary unit 5 incorporating the photoelectric sensor composed of the light source section 16 and the light receiving unit 18 is rotated. Light from the light source section 16 is applied through the sleeve 10 and the conveyor belt 11 to the object. Portions of the light are blocked by the object so that the projection pattern corresponding to the shape of the object is sensed by the light receiving section 18. While the object is being detected in this manner, the angle of rotation of the cylindrical rotary unit 5 is detected by the micro-photosensor 7 utilizing the fins 8. The actual projection pattern thus read is applied as an electrical signal to the computer 14 where it is stored. In the computer 14, the actual projection spectra forming the actual projection pattern are subjected to analysis to recognize the solid figure of the object as a result of which the solid figure recognition data is outputted through the output device 15.

As described, the actual projection pattern of an object is obtained by turning the cylindrical rotary unit through 180°. However, it goes without saying that a valid actual projection pattern can be obtained by rotating the cylindrical rotary unit an integer times through 180°.

A tube-type tungsten lamp emitting visible rays, a light-emitting diode emitting visible rays, ultraviolet rays or infrared rays, or a laser beam source may be employed as the light source section. That is, substantially any light source may be employed if it emits light continuously. It should be noted that a light source such as a fluorescent lamp which emits discontinuous light is preferably not employed as the light source section. A phototransistor, a photodiode or an image sensor can be employed as the light receiving section.

It is preferable that the speed of rotation of the rotary unit be in the range of from 50 to 1200 r.p.m. although it may be higher if desired.

In practice, the conveyance speed of an object through the rotary unit should be in a range from 5 cm/sec to 60 cm/sec as it passes through the hollow part of the rotary unit.

It is preferable that an object to be recognized be opaque. However, even an object is made of transparent glass or plastic, it may nonetheless be recognized if its actual projection pattern can be obtained when the object is irradiated.

The kinds of objects to which the invention can be applied are not particularly limited. Examples of such objects are agricultural products, marine products, industrial products, food, chemicals, packaged articles and miscellaneous goods.

It is anticipated that the object solid figure recognizing apparatus according to the invention be used in combination with other machines or devices. For instance, it may be operated in combination with a sorting machine, conveying machine which moves either horizontally or vertically, a packaging machine which operates to select a suitable packaging sheet depending on the size of an object and to package the object with the sheet, a labelling machine which operates to put price labels or size labels on commodities, or an industrial robot. If the apparatus is employed in manufacturing industrial products, then the quality of the products can be controlled according to the detected shape of the objects.

Furthermore, novel functions which have not been heretofore realized commerically can be provided according to the invention. For instance, previously, in selecting or sorting fruits such as peaches, apples or pears according to volume, the only available technique involved putting the fruits in water. This method was not used in practice because once the fruits are put in water, the quality thereof deteriorates. However, with the use of the invention, fruits such as peaches, apples or pears can be sorted according to the weights and volumes without immersing them in water.

As is apparent from the above description, the invention is quite significant in that, although a visual measurement technique has been previously employed for recognizing the shape of a solid object, the three-dimensional shape of an object can be readily recognized according to the invention. The range of application of the invention is very wide in that the invention can be applied to the processes of selection, distribution, decision, measurement and inspection according to the shapes of natural and industrial products. The apparatus of the invention is not dependent on an uncertain human decision. That is, it conducts the recognition process according to accurate and certain references utilizing the computer. Thus, according to the invention, the solid figure recognition can be readily achieved automatically at high speed with less labor and less cost.

To aid in a full understanding of the invention, specific examples thereof will be described.

EXAMPLE 1

A sorting machine capable of sorting materials according to six classifications was coupled to the output of the solid object shape recognizing apparatus of the invention shown in FIGS. 3 and 4 to automatically sort vegetables and fruits. In this example, the specifications of the apparatus were as follows. This light source section in the photoelectric sensor was made up of two tube-type 40 W tungsten lamps which were arranged in the form of the character "T" and the sensor or light receiving section was made up of sixty phototransistors. More specifically, the sixty phototransistors were divided into groups of twenty-four and thirty-six phototransistors. The two groups of phototransistors were also arranged in the form of the character "T" with the phototransistors spaced 5 mm from one another. The light source section and the light receiving section were covered with cylindrical hoods and were confronted with each other with a distance 200 mm therebetween in the cylindrical rotary unit. The speed of rotation of the cylindrical rotary unit was 500 r.p.m. Ninty-six fins were provided at equal intervals on the outer wall of the cylindrical rotary unit so as to provide a small incremental angle of rotation of 3.75°. Furthermore, a transparent sleeve 160 mm in diameter, 800 mm in length having a wall thickness of 3 mm and made of acrylic resin was disposed in the cylindrical rotary unit and was fixedly secured horizontally so that the cylindrical rotary unit could rotate around the pipe without contacting the pipe. A transparent conveyor belt made of vinyl chloride was provided so that an object could be moved quickly through the transparent pipe. The belt speed was 30 mm/sec. The signal transmission and data transmission between the sensor device in the rotary unit and a microcomputer having 12 bits/word, a 2K RAM and a 2K PROM provided outside of the apparatus were conducted through the input and output device with the aid of the slip ring device. The input and output devices of the microcomputer were connected to the branch terminal of the sorting machine and the sorting operation was carried out according to the outputs of the microcomputer.

(a) Program 1

A program was provided to sort out citrus fruits according to size and to check for abnormal shapes thereof. Five sizes were provided according to the average fruit diameter and height. The fruits were sorted according to the five sizes. Fruits which had grown to an abnormal shape were segregated from good fruits irrespective of size.

(b) Program 2

A program was provided to classify cucumbers according to the lengths, diameter, diameter uniformity and curvature thereof. Cucumbers which has an extremely high diameter uniformity and were considerably bent were segregated from good ones irrespective of size. The remaining cucumbers were classified into groups of "L" size, "M" size and "S" size according to their diameter.

EXAMPLE 2

The sum of the volumes of peaches or apples was measured using the shape recognizing apparatus of the invention. In this measurement, the specifications of the apparatus were similar to that of Example 1 described above but a sorting machine was not used. Programs were provided for calculating the volumes of peaches and apples. Each of the programs was corrected with the suitable average values of the recesses at the tops and bottoms of the fruit. As a result, the volume of fruits calculated by the apparatus according to the invention and that obtained using the water immersion technique differed from each other by no more than 3% thus showing a high correlation in measurement accuracy therebetween. Using presently available techniques, the weights of such fruits can be readily determined with high accuracy. Therefore if a weight detector is utilized along with the apparatus of the invention, the specific gravities of the fruits can be measured. At present, the fruits are sorted according to the ranks and grades. The ranks of the fruits are determined by sorting them through visual inspection according to the hues, configurations and external appearance such as whether or not a fruit has been bruised. The grades of the fruits are determined by sorting them according to sizes of "LL", "L", "M", "S" and "SS".

It cannot be said that a satisfactory correlation can be made between the external appearance of the fruit and its internal condition utilizing the conventional fruit sorting method. That is, it is rather difficult utilizing the conventional fruit sorting method to satisfactorily determine the internal conditions of fruits. Therefore, the prices of fruits which are determined by sorting according to the conventional fruit sorting method may not accurately reflect the value of the fruits and hence lead to customer dissatisfaction. At present, the internal conditions of fruits can only be accurately determined by a destructive inspection in which polarization, acidity and juiciness are measured and the internal condition of the fruits is observed. Therefore, the conventional destructive inspection is disadvantageous because the internal conditions of fruits cannot be determined without destroying them. Recently, it has been considered most advantageous to employ the spesific gravities of fruits to estimate the internal conditions thereof. Thus, a novel fruit sorting technique utilizing the specific gravities of fruits has been developed utilizing the invention in which the volumes of fruits are accurately determined.

EXAMPLE 3

With the automatic sorting apparatus of Example 1, small boxes were automatically sorted and distributed. The small boxes sorted were eight kinds of medicine boxes of different kinds having different sizes. Therefore, the boxes were sorted by the apparatus of the invention according to the sizes thereof. At the branching outlets of the sorting machine, the boxes were assembled into sets of different boxes which were then distributed. In this operation, boxes which were not placed initially in any particular set of boxes were returned to the starting position of the process by a returning mechanism so that they were mixed with newly supplied boxes so as to be automatically sorted and distributed again.

Figure 5:
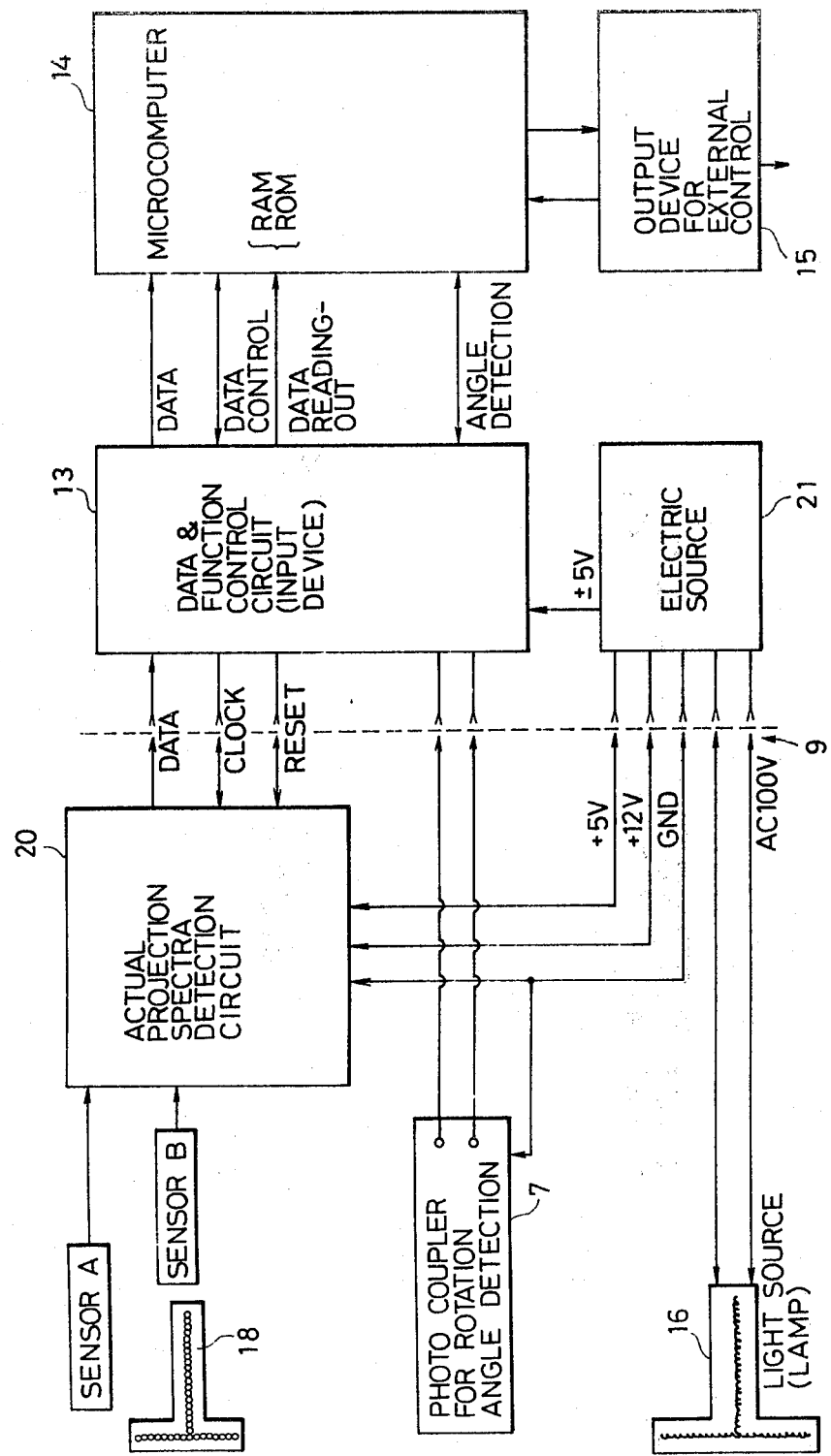
FIG. 5 is a block diagram showing the computer and related components in detail of the arrangement of FIG. 3.

Next, explanation will be given regarding the operation of the computer 14 wherein as an example, a microcomputer and T-shaped sensor are employed. FIG. 5 shows an example of an electronic control circuit in which the circuits to the left of the broken line are accommodated in the rotary unit 5. In the control circuit, all functions are automatically controlled by a ROM (Read Only Memory) included in the microcomputer. When an object to be recognized is brought into a sensor zone by the transparent conveyor belt, the tip end of a sensor B oriented in a direction the same as the direction of movement of the object detects the object at the light receiving section 18 and the sensor B collects information for acknowledging characteristics of the object with respect to the direction of movement of the object. Thereafter, when the actual projection pattern of the moving object is in contact with a sensor A positioned perpendicular to the moving direction of the object, information is collected relating to the cross-sectional characteristics of the object with respect to the direction perpendicular to the direction of movement of the object from around the periphery of the object with a small incremental angle of resolution. Thus, the actual projection pattern spectra received at the sensors A and B for each incremental rotary angle is stored by an actual projection spectra detection circuit 20 and by a RAM (Random Access Memory) of the microcomputer via the pick-up device 9 and an input and output device, specifically, the data and function control circuit 13. Collection of the actual projection spectra by the sensors A and B is achieved for each incremental angle of rotation defined by fins 8 disposed on the cylindrical rotary unit. The operation is continuously carried out until the object has completely passed through the sensor zone. Therefore, information data as actual projection patterns is collected in the RAM of the microcomputer 14 and accumulated for every incremental rotation angle.

The computer 14 may, for instance, be a type TLCS microcomputer produced by Toshiba Company.

Upon the completion of an object passing through the sensor zone, the microcomputer re-resolves the actual projection pattern into actual projection spectra utilizing the aforementioned "slice concept" and a designated solid characteristic is calculated by a program based on the data. An output signal is transmitted to an external control output device. Reference numeral 21 designates an electric source. The acknowledgement of the solid characteristics of the designated object can be processed over a wide range of shapes because of the extreme flexibility of the calculation program. Therefore, the dimensions of several parts of the object, the volume, extending portions of the object, the unevenness of specific portions, and the configuration or arrangement of the object can all be detected.

What is claimed is:

1. A method for recognizing the shape of a three dimensional object comprising the steps of: rotating a hollow cylindrical rotary unit having an internal photoelectric sensor having a light source section and a light receiving section confronting with said light source section; moving an object through the hollow part of said cylindrical rotary unit on a transparent conveying means; applying light from said light source section to said object to detect an actual projection pattern of said object; and analyzing an actual projection spectra forming said actual projection pattern by a computer to recognize the shape of said object.

2. The method as claimed in claim 1 further comprising the step of delivering the results of analysis of said actual projection spectra by said computer as three dimensional figure recognition datum from said computer through output means.

3. A method for recognizing a shape of a three dimensional object comprising the steps of:
   rotating a hollow cylindrical rotary unit, conveying an object to be shape-recognized into a hollow part of said rotary unit by means of a transparent conveying means, said hollow cylindrical rotary unit having a photoelectric sensor comprising a T-shaped light source section and a T-shaped light receiving section confronting said light source section;
   collecting an actual projection pattern data of said object by detecting an actual projection of said object by means of a first sensor portion of said T-shaped light receiving section when said object passes through a sensor zone, said first sensor portion extending along conveying direction of said object, said actual projection pattern data of said object along its longitudinal direction thereof being collected by said first sensor portion at discrete rotation intervals of said rotary unit sensed by fins provided at an outer surface of said rotary unit and data of transverse cross-sectional characteristic of said object being collected by a second sensor portion of said T-shaped light receiving section when said object passes said second sensor portion extending perpendicular to the conveying direction of said object, said collection being made at discrete rotation intervals of said rotary unit determined by said fins;
   storing said actual projection pattern data for each discrete rotation interval into an actual projection pattern detection circuit, said actual projection data being obtained by outputs of said first and second sensor portions;

storing said actual projection data in a Random Access Memory of a computer through a pick-up device and an input device;

collecting datum of said actual projection pattern data in said Random Access Memory until said object completes a pass through said sensor zone;

resolving said actual projection pattern data of said object back into an actual projection spectra in accordance with a program stored in a Read Only Memory after said object passes through said sensor zone; and analyzing three dimensional spectra to detect three dimensional characteristics of the object, and outputting said analysis by an output device.

4. An apparatus for recognizing the shape of a three dimensional object comprising: a hollow cylindrical rotary unit having an internal photoelectric sensor having a light source section and a light receiving section adapted to optically read the actual projection pattern of an object; input means for transmitting said actual projection pattern to memory means in a computer; memory means for storing said actual projection pattern and actual projection spectra forming said actual projection pattern; processing means for analyzing said actual projection pattern to perform figure recognition of the shape of said object; output means for delivering the result of said three dimensional figure recognition as three dimensional object recognition datum from said computer; and means for conveying said object through the hollow portion of said rotary unit at a constant speed while supporting said object, said means for conveying made of a transparent material.

5. The apparatus as claimed in claim 3 wherein said cylindrical rotary unit is provided with rotational position determining fins on an outer wall thereof.

6. The apparatus of claim 4 wherein said input means is operated each predetermined small incremental angle of rotation.

7. The apparatus of claim 4 wherein a moving object to be detected is divided into a plurality of slices with planes perpendicular to the direction of movement of said object.

8. The apparatus of claim 7 wherein said processing means recognizes the shape of each slice of an object from an actual projection spectra for each of said slices.

9. The apparatus as claimed in claim 4 wherein said light source section and light receiving section are T-shape and are provided symmetrically on the inner wall of the rotary unit.

10. The apparatus as claimed in claim 4 wherein said cylindrical rotary unit is provided with rotational position determining means comprising fins and a photosensor.

11. The apparatus as claimed in claim 4 wherein said cylindrical rotary unit is provided with slip rings on the outer surface thereon together with a pick-up device for providing a power input to said photoelectric sensor inside the rotary unit and for transmitting datum between the rotary unit and processing means.

* * * * *